Sept. 7, 1965  R. G. SPREEN  3,204,492
METHOD OF DRILLING

Filed April 29, 1963  2 Sheets-Sheet 1

INVENTOR.
ROBERT G. SPREEN
BY
*Howard Weiner*
*& Jack J. Earl*
ATTORNEYS

Sept. 7, 1965  R. G. SPREEN  3,204,492
METHOD OF DRILLING
Filed April 29, 1963  2 Sheets-Sheet 2

United States Patent Office 3,204,492
Patented Sept. 7, 1965

3,204,492
METHOD OF DRILLING
Robert G. Spreen, Loveland, Ohio, assignor to The Cincinnati Milling Machine Co., Cincinnati, Ohio, a corporation of Ohio
Filed Apr. 29, 1963, Ser. No. 276,379
3 Claims. (Cl. 77—5)

The present invention relates to a drilling operation and more particularly to a process for drilling a hole in a ferro-magnetic member and for removing the chips generated by the operation from the hole produced.

The problem of chips being left in a drilled hole after removal of the drill has always been troublesome in the instances where the hole is deep and the drilling act is to be followed immediately by a second operation such as reaming or tapping. The problem becomes especially acute in the use of pre-programmed automatic machines such as the well known tape controlled machines which are currently finding broad acceptance throughout the metalworking industry. Chips left in a drilled hole can often prevent a following operation from being successfully completed and the chips sometimes cause tool breakage. In the automatic processes described, constant attention to the condition of drilled holes cannot be expected of the machinist who is operating the machine since often he is attending more than one machine or has other duties to perform during the time of an automatic machine cycle. It has been a common practice in the past, and particularly in cast iron machining, to use an air blast or stream directed into the drilled hole to remove the chips therefrom. This works satisfactorily in shallow holes but in the deeper holes, the chips may not be readily removed by an air blast and therefore this method has been found to be unsatisfactory, particularly in automated operations.

It is therefore an object of this invention to provide an improved drilling process by which the waste chips are removed from a deep, drilled hole at the completion of the drilling operation.

Other objects and advantages of the present invention should be readily apparent by reference to the following specification, considered in conjunction with the accompanying drawings forming a part thereof, and it is to be understood that any modifications may be made in the exact structural details there shown and described within the scope of the appended claims, without departing from or exceeding the spirit of the invention.

In its preferred form the process of this invention utilizes a magnetized drill in a programmed operation on a ferro-magnetic material such as cast iron and the operation is performed by a completely automated machine. The rotation of the drill is stopped with the drill still in the hole after drilling and then the drill is removed from the hole. After it clears the hole, rotation of the drill is momentarily resumed while an air blast is directed at the drill. The combination of the force of the air blast and the centrifugal effect of the rotating drill causes the chips which have clung to the drill during its withdrawal from the hole to be cleaned from the drill. The air blast also acts to prevent the chips from falling back into the hole in the case of a vertically arranged drill spindle. A clear understanding of the invention can be obtained from the following detailed desciption in which reference is made to the attached drawings wherein:

Figure 1:
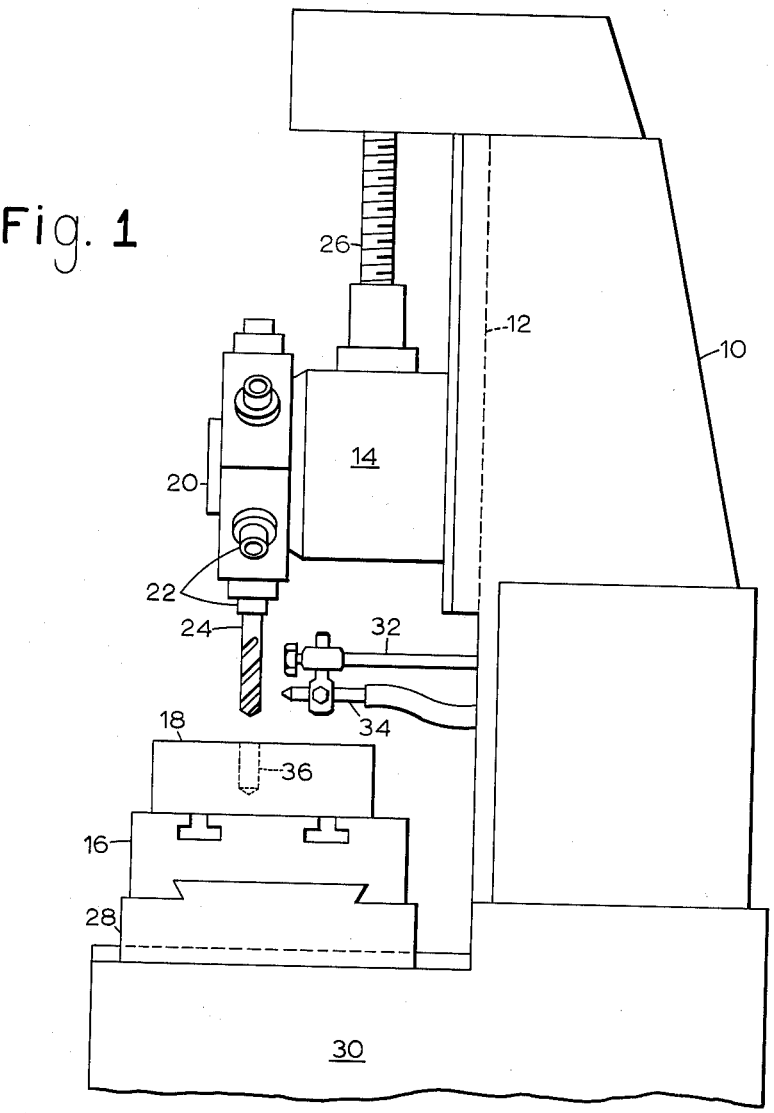
FIG. 1 is a side elevation view of an automatic turret type drilling machine.

The machine shown in FIG. 1 is of the type which is popular for performing drilling machine operations automatically by the application of numerical control techniques with a minimum of operator attention. The machine includes a vertical column 10 along the side of which ways 12 are formed to guide a spindle carrier 14 toward and away from a worktable 16 on which a workpiece 18 is supported during a drilling operation. The spindle carrier 14 has a turret 20 attached thereto and the turret 20 is angularly indexable to place one of a plurality of spindles 22 in an operative position over the workpiece 18. As shown, a drill 24 is received in the spindle 22 which is operatively positioned over the workpiece 18. The operative spindle is rotatable in the turret 20 in a well known manner and a screw mechanism 26 is operated to move the spindle carrier 14 downward toward and upward away from a selected point on the workpiece 18 at which it is desired to drill a hole 36. Selection of the hole location on the workpiece 18 is achieved in the described machine by combined transverse movement of the worktable 16 on a saddle 28 which in turn is movable toward and away from the column 10 on a base member 30. A bracket member 32 is fixed to and extends from the column 10 outward toward the drill 24 when it is directly positioned above the workpiece 18. The bracket 32 supports an air nozzle 34 through which a constant stream of air under pressure is directed against the drill 24 and across the top of the workpiece 18 where it is desired to have the hole 36. The air blast from the nozzle 34 acts as both a coolant medium and as a chip remover. Machines of the type described are widely used throughout the metal working industry and the details of the automatic control and feed mechanisms for the various movable members are not described in further detail herein as machines of this type are well known in the art, therefore rendering further detail in this application unnecessary. While a vertical, turret type drilling machine has been described as the setting for the inventive process herein to be described, it is also applicable as well in single or multiple spindle machines which may be either vertically or horizontally arranged.

Figure 3:
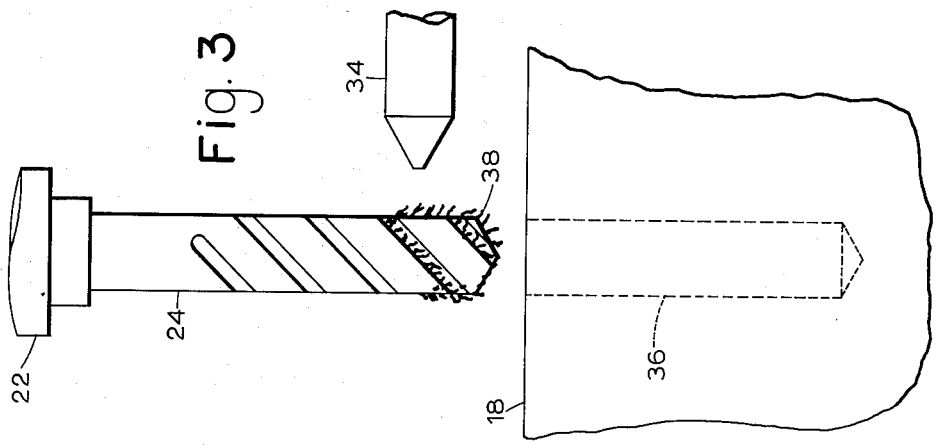
FIGS. 2 and 3 are enlarged views of a drill and workpiece on the machine of FIG. 1, the drill and workpiece being in different relative positions in each of the two views.
Figure 2:
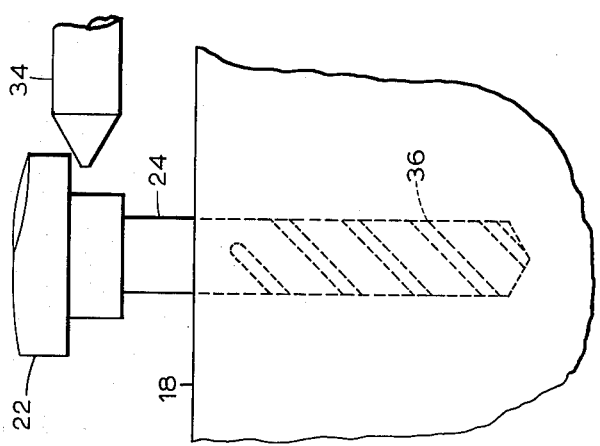

In operating the described machine in accordance with the principles of this invention, the drill bit 24 is magnetizable and in the preferred embodiment it is permanently magnetized. The drill 24 is chucked in the spindle 22 in any conventional manner and the spindle 22 is rotated at a rate selected to provide a proper cutting action in the material of the workpiece 18 which in the described operation can be assumed to be of cast iron for which a liquid cutting fluid and coolant is not required. In the first step of the programmed process, the rotating drill 24 is fed downward into the workpiece until it has cut a hole therein of required depth as shown in FIG. 2. The drill 24 is stopped from rotating while it is still in the workpiece 18 at or near the bottom of the hole 36 formed therein. When the drill 24 has stopped rotating, the machine spindle carrier feed is reversed to withdraw the drill 24 from the hole 36 to the relative position shown in FIG. 3. In this position it is out of the hole 36 and at a location such that the blast of air from the nozzle 34 is directed against the lower portion of the drill 24 and across the opening of the hole 36. The rotation of the drill 24 is then momentarily resumed and the combined action of the air blast from the nozzle 34 and the centrifugal effect of the rotating drill 24 cause the chips 38 which have clung to the magnetized drill 24 to be cleaned therefrom. Since the air blast is directed across the top of the hole 36 and the centrifugal effect tends to throw the chips outward, they are blown away without their falling back into the hole 36 in any substantial volume.

Figure 4:
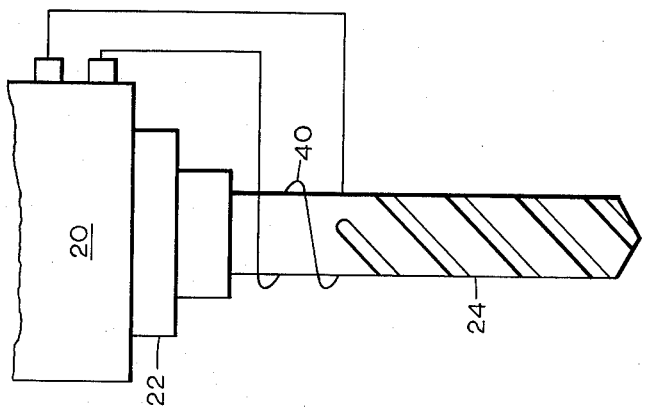
FIG. 4 is a simplified showing of an alternate form of magnetized tool for use in this invention.

While the drill 24 has been described in the preferred form as permanently magnetized, this need not be the case in alternative practices of the process. As shown in FIG. 4, a magnetizing coil 40 may be disposed around the drill 24 at its upper shank end to provide means for magnetizing a drill bit, which does not have the quality of persistent residual magnetism, at the time that it is at the bottom of the hole 36. The coil 40 must be energized to magnetize the drill 24 as it is withdrawn from the hole 36 and may be deenergized once the drill 24 is removed from the hole 36 and has begun to rotate in the air blast from the nozzle 34.

The process has been described specifically with the use of an air blast from the nozzle 34. The use of any other harmless gas under pressure will also work as will the use of a liquid discharge under pressure from the nozzle 34. The use of the liquid however has the great disadvantage that it creates a mess around a machine unless very effective steps are taken to confine the liquid spray to the immediate area of the worktable 16 since it must be directed under pressure against the rotating drill 24. For purposes of this application the use of a liquid under pressure to clean the chips from the drill 24 is deemed the full equivalent of an air blast as is the use of any other fluid under pressure and as a full equivalent it is deemed to be within the spirit of the invention and the scope of the claims which follow.

What is claimed is:

1. A process for drilling a hole in a ferro-magnetic workpiece and for removing chips from the hole comprising the steps:
   (a) moving a rotating magnetized drill bit to a preselected depth in the workpiece in a drilling operation,
   (b) stopping rotation of said bit while said bit is in the workpiece at the preselected depth,
   (c) withdrawing said bit from the workpiece,
   (d) rotating said bit after withdrawal, and
   (e) subjecting said bit while rotating to a stream of fluid under pressure.

2. A process for drilling a hole in a ferro-magnetic workpiece and for removing chips from the hole comprising the steps:
   (a) moving a rotating and permanently magnetized drill bit to a preselected depth in the workpiece in a drilling operation,
   (b) stopping rotation of said bit while said bit is in the workpiece at the preselected depth,
   (c) withdrawing said bit from the workpiece,
   (d) rotating said bit after withdrawal, and
   (e) subjecting said bit while rotating to an air blast.

3. A process for drilling a hole in a ferromagnetic workpiece and for removing chips from the hole comprising the steps:
   (a) moving a drill bit to a preselected depth in the workpiece in a drilling operation,
   (b) stopping rotation of said bits while said bit is in the workpiece at the preselected depth,
   (c) magnetizing said drill bit while it is in the workpiece,
   (d) withdrawing said bit from the workpiece while magnetized,
   (e) rotating said bit after withdrawal, and
   (f) subjecting said bit while rotating to an air blast.

No references cited.

WILLIAM W. DYER, JR., *Primary Examiner.*